Jan. 17, 1956 T. B. DALTON 2,731,120
RATCHET CRANK
Filed Sept. 14, 1953 2 Sheets-Sheet 1

INVENTOR.
THOMAS B. DALTON
BY
Barnes, Kisselle, Laughlin & Raisch
ATTORNEYS.

Jan. 17, 1956  T. B. DALTON  2,731,120
RATCHET CRANK
Filed Sept. 14, 1953  2 Sheets-Sheet 2
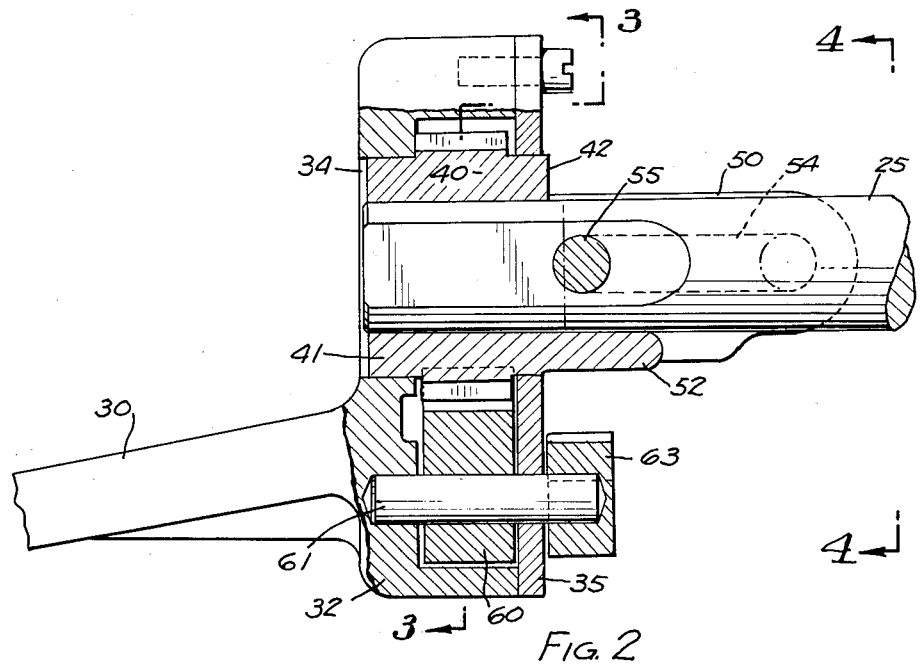
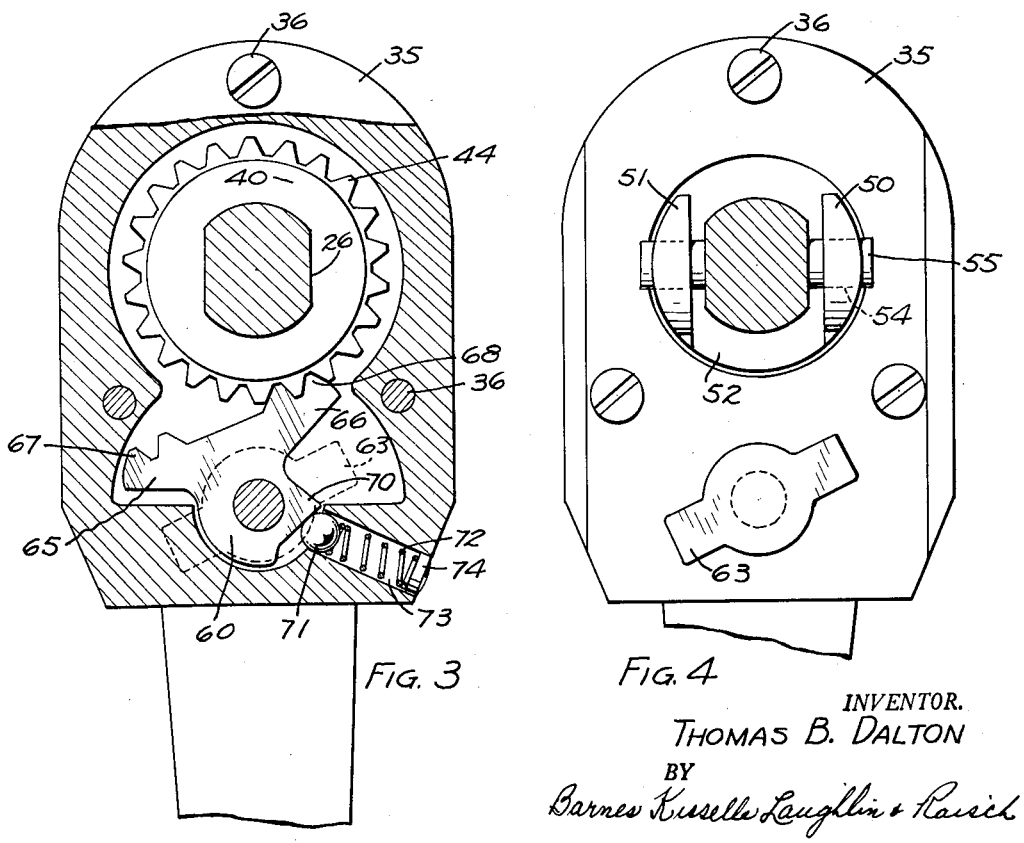
INVENTOR.
THOMAS B. DALTON
BY
Barnes Kisselle Laughlin & Raisch
ATTORNEYS

United States Patent Office 2,731,120
Patented Jan. 17, 1956

2,731,120

RATCHET CRANK

Thomas B. Dalton, Muskegon, Mich., assignor to West Michigan Steel Foundry Co., Muskegon, Mich., a corporation of Michigan Application September 14, 1953, Serial No. 379,761

6 Claims. (Cl. 192—43.1)

This invention relates to a crank especially adapted for the manual operation of supporting legs of a semi-trailer type of vehicle.

A semi-trailer is a vehicle which usually has ground engaging wheels at its rear end, and the forward end, when in use, rests upon a tractor, usually through the means of a form of fifth wheel. For loading and unloading purposes and for storage, the tractor and semi-trailer are separated and the semi-trailer usually has a form of foldable or retractable supporting legs which supports the forward end when it is detached from the tractor. The supporting legs or land gear, as they are sometimes called, are usually shifted to and from supporting position by means of an operating shaft, the shaft being manipulated by an operator. Sometimes it is necessary to operate the shaft to lift or elevate the semi-trailer body together with its load in order to make a satisfactory coupling with a tractor. This sometimes requires a considerable manual effort. Sometimes the crank on the shaft may be a little difficult for an operator to reach or to get a good purchase on it so that it is sometimes difficult to rotate a crank through its full circle even if only the supporting legs are being elevated or otherwise manipulated.

The present invention aims to provide a crank for operating a shaft and particularly a crank adapted for use with the semi-trailers wherein the crank itself embodies a ratchet construction. The ratchet crank is thus a complete sub-assembly in itself and may be applied to new or old equipment. In this way structures already in use may be improved without modifying the structure otherwise by applying the new crank thereto. The crank, of course, may have uses other than with trailers, but the use with trailers provides a good example.

The invention is exemplified in the crank shown in the accompanying drawings:

In the drawings:

Fig. 2 is a view largely in section taken through the case or housing of the crank and illustrating the same applied to an operating shaft.

Fig. 3 is a sectional view taken substantially on line 3—3 of Fig. 2 showing the toothed members of the ratchet structure.

Fig. 4 is a view taken substantially on line 4—4 of Fig. 2 illustrating a cover for the case and other parts.

Figure 1:
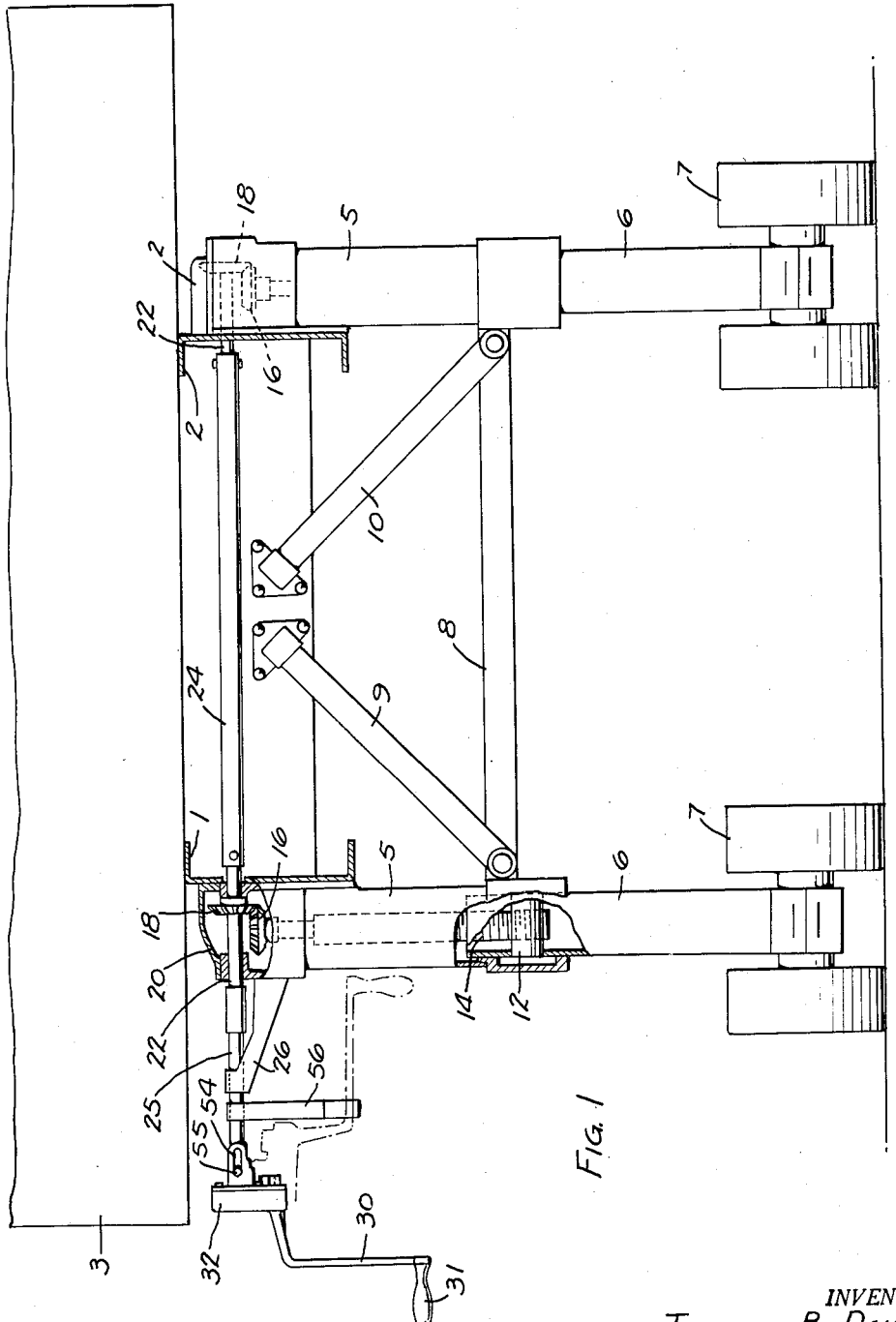
Fig. 1 is a general view with parts broken away and parts in section illustrating a semi-trailer frame which supports and showing the crank of the invention applied thereto.

Frame members of a semi-trailer are illustrated at 1 and 2 in Fig. 1 and the body resting therein is illustrated at 3. Supporting legs are indicated, there being one supporting leg attached to each frame member and since they may be identical and merely reversed in position, a description of one will suffice. The supporting legs shown are only one form which may be used with the crank. The supporting structure shown is constituted by a fixed tubular leg section 5 secured to the frame and a projectable and retractable leg section 6 which telescopes into the section 5 and the projectable portion has ground engaging wheels 7. The fixed sections 5 may be reinforced by a cross member 8 and further reinforced by diagonal braces 9 and 10.

Each projectable section 6 has a nut 12 operable by a screw 14 so that upon turning screw 14 the projectable leg section is raised or lowered. Each screw is equipped with a bevelled gear 16 the teeth of which mesh with a bevel gear 18, and the gears may be enclosed in a housing structure 20 constituting the upper end of the fixed leg section.

An operating shaft 22 is journalled in the housing for operating the gear 18, and the shafts 22 are interconnected by a cross shaft or tube 24. Connected to one shaft 22 is an operating shaft 25 journalled in a support or bracket 26. This operating shaft 25 projects from the frame far enough so that it is accessible for receiving a crank for its operation. The extreme end of the shaft 25 is formed so that the crank may be non-rotatably connected thereto and as shown in Figs. 2 and 3 the shaft is flattened on opposite sides as shown at 26.

The crank has a suitable crank arm 30 with a handle 31 and the base of the crank is in the form of a body in the form of a case or housing 32. The crank arm and housing are conveniently integrally formed. The housing is formed with an opening 34 in one wall and the opposite side thereof is open and is closed by a cover plate 35 which may be held in position by screws 36.

A toothed ratchet member 40 is disposed within the housing and it has a bearing portion 41 fitting in the opening 34 and a bearing portion 42 fitting in an opening in the cover plate. Thus the ratchet member is journalled in the housing. The intermediate part of the ratchet member is of gear-like form having an annular array of teeth 44, as shown in Fig. 3. This intermediate part has a greater diameter than the bearing portions 41 and 42 and thus is held within the housing when the cover plate is attached. The ratchet member 40 has an opening therein for receiving the flattened end of the shaft 25 and thus may be non-rotatably connected to the shaft.

The member 40 has projecting portions 50 and 51 for extending opposite sides of the shaft 25 and these portions may be reinforced by a fillet 52. The projecting portions or ears each have an elongated slot 54 for receiving a cross pin or bolt 55 which extends through the shaft 25. Thus, the crank is attached to the shaft permanently but slidably. As shown in Fig. 1 the ratchet member is applied to the end of the shaft and the base of the crank is positioned well onto the shaft with the pin 55 engaging in the ends of the slots 54. By pulling the crank to the left as Fig. 2 is viewed, the ratchet member 42 may be disengaged from the end of the shaft but the limit of the movement is determined by the opposite ends of the slots 54 engaging the pin 55. When the crank is thus pulled off the shaft it may be swung on the pin to the dotted line position shown in Fig. 1 and engaged in a hook or bracket 56. This is the position the crank may take when the vehicle is in operation.

The pawl member of the ratchet is illustrated at 60 and it is non-rotatably mounted on a roll or spring pin 61 one end of which may be located in a recess in the housing. The roll or spring pin extends through the cover plate in which it is journalled and on its outer end is a lever or finger piece 63. The pawl has two pawl arms 65 and 66 for cooperation with the ratchet member. Teeth 67 and 68 are provided for engagement with the teeth 44 of the ratchet member. Advantageously two teeth are provided on each arm. The pawl also has a projection 70 acted upon in detent fashion by a ball 71 backed up by a coil spring 72. The ball and spring are positioned in an opening 73 which may be closed by a plug 74 to form a reaction for the spring.

In the operation of the crank it will be appreciated from the above description how the crank may be folded to the dotted line position, shown in Fig. 1, when the vehicle is in transit, and to operate the supports the crank is disengaged from the hook or bracket 66 and applied to the shaft as shown in Figs. 1 and 2. If the pawl is in the position shown in Fig. 3, the operator may turn the crank counter-clockwise. The torque is transmitted to the ratchet member by thrust action on the portion 66 of the pawl and the crank may be turned through its entire circle of movement. If heavy load conditions exist, however, or if the operator cannot conveniently manipulate the crank, because of some other obstruction or another vehicle which may be in the way, the crank may be operated ratchet fashion. In other words, it may be turned counterclockwise with the pawl positioned as shown in Fig. 3 for a distance and then in a clockwise direction at which time the teeth 68 of the pawl ride or ratchet over the teeth 44 until such time as the operator desires to again impart counter-clockwise movement to the shaft 25. The pawl may be turned by the lever 63 to position the teeth 67 for operation with the teeth of the ratchet member. In this action projection 70 moves past the spring pressed ball and then the ball again engages the opposite side of the projection 70. With this adjustment the shaft may be turned clockwire and the crank may be turned through its full cycle of movement or may be given the oscillating or pumping action with the ratchet action taking place on alternate strokes. The spring pressed ball holds the selected teeth of the pawl in engagement with those on the ratchet member and the spring flexes to permit of the ratcheting action. Due to the toggle effect between the ratchet member 40 and the pawl member 60, the pawl cannot become disengaged from or slip out of mesh with respect to the ratchet member during the power transmitting movement or stroke. This eliminates personal injury to the operator. The ratchet crank is a complete subassembly in itself and may be applied to any shaft and although it has a particular use with the supporting legs of semi-trailers, it may be used wherever any such mechanism is desired. It is to be appreciated that the screw mechanism in the legs are self-retaining, in that although under heavy load, the screws 14 do not turn under such load. Therefore, the crank may have the ratchet action and it is not necessary to hold the shaft 25 from turning as the crank is ratcheted.

I claim:

1. A crank structure comprising, a crank arm having means at one end for its manipulation, a housing at the opposite end, a ratchet member journalled in the housing and having an annular array of teeth thereon, a double ratchet pawl pivotally carried by the housing having two projecting arms, the pawl being selectively positionable for selective engagement of the arms with the teeth of the ratchet member, spring means acting upon the pawl for holding the selected arm thereof in engagement with teeth of the ratchet member, means on the ratchet member projecting from the housing and constructed and arranged to be slidably connected to a shaft, the ratchet member having a formation thereon for engagement with the shaft in relatively non-rotatable manner and for disengagement of the shaft incident to the sliding action, the interengagement of selected arm on the pawl with teeth on the ratchet member being such that when the crank is turned in one direction the pawl transmits torque to the ratchet member and holds it immovable relative to the crank, for the transmission of torque to the shaft, and when the crank is turned in the opposite direction the selected arm on the pawl rides over the teeth on the ratchet member.

2. A crank and shaft combination comprising, a shaft with an end portion non-circular in form, a crank having means at one end for its manipulation, a housing at the opposite end, a ratchet member journalled in the housing and having an annular array of teeth thereon, the ratchet member having a non-circular opening therein for application to the said end of the shaft, means on the ratchet member projecting on the housing, means permanently and slidably connecting the projecting means and shaft so that the ratchet member may be applied to and removed from the end of the shaft while the crank remains permanently connected thereto, and a spring pressed pawl for engaging teeth of the ratchet member and adapted, when the crank is turned in one direction, to transmit torque to the ratchet member and hold the ratchet member immovable relative to the crank arm to transmit torque to the shaft, and adapted, when the crank arm is turned in the opposite direction, to ride over the teeth of the ratchet member without transmitting torque.

3. A crank and shaft combination comprising, a shaft with an end portion non-circular in form, a crank having means at one end for its manipulation, a housing at the opposite end, a ratchet member journalled in the housing and having an annular array of teeth thereon, the ratchet member having a non-circular opening therein for application to the said end of the shaft, means on the ratchet member projecting from the housing, means permanently and slidably connecting the projecting means and shaft so that the ratchet member may be applied to and removed from the end of the shaft while the crank remains permanently connected thereto, a double pawl carried by the housing having oppositely acting pawl arms, means for positioning the pawl to engage selectively a pawl arm with teeth of the ratchet member, spring means acting upon the pawl for holding the selected arm in engagement with the teeth on the ratchet member, the interengagement of the selected arm with the teeth on the ratchet member being such that when the crank is turned in one direction torque is transmitted to the ratchet member to thereby transmit torque to the shaft, and when the crank is turned in the opposite direction the selected pawl arm rides over the teeth on the ratchet member.

4. A ratchet crank structure for the operation of supporting legs of a semi-trailer wherein the supporting legs have an operating shaft, a crank arm having means at one end for its manipulation, a housing at the opposite end, a ratchet member journalled in the housing and having an annular array of teeth, a double spring pressed pawl having oppositely acting pawl arms pivotally carried by the housing, means for positioning the pawl to selectively engage its pawl arms with teeth of the ratchet member, the ratchet member having a formation thereon for detachable application to the shaft in relatively non-rotatable manner, the interengagement of the selected pawl arm and the teeth on the ratchet member being such that when the crank is turned in one direction, torque is transmitted to the ratchet member, to thereby transmit torque to the shaft, and when the crank is turned in the opposite direction the selected pawl arm rides over the teeth on the ratchet member, and a part on the ratchet member adapted to be permanently, slidably and rockably connected to the shaft and operable for the connection and disconnection of the said formation on the ratchet member in relatively non-rotatable manner with the shaft.

5. A self-contained ratchet crank structure adapted for application to a shaft comprising, a crank arm having means at one end for its manipulation, a housing at the opposite end of the crank arm, said housing having an opening in its wall, a cover plate for the housing having an opening therein, a ratchet member having end portions journalled in the openings in the housing and cover plate and having an intermediate portion with an annular array of teeth, the ratchet member having a non-circular central opening adapted to removably, slidably and non-rotatably connect to the shaft, a double pawl pivotally mounted in the housing and having oppositely acting pawl arms, means for adjustably positioning the pawl to selectively engage the arms with the teeth of the ratchet member, spring means acting upon the pawl to hold a selected arm in engagement with the teeth of the ratchet member, an extension on the ratchet member and means slidably connecting the extension to the shaft having such extent of sliding movement that the ratchet member may be applied to and removed from the shaft, the engagement of the selected arm and teeth being such that when the crank is turned in one direction the pawl transmits torque to the ratchet member and holds the ratchet member immovable relative to the crank arm, to thereby transmit torque to the shaft, and when the crank is turned in the opposite direction the selected pawl arm rides over the teeth on the ratchet member.

6. A self-contained ratchet crank structure comprising, a crank arm having means at one end for its manipulation, a housing at the opposite end of the crank arm, a cover plate for the housing, the housing and cover plate having openings therein, a ratchet member having an annular external array of gear like teeth on its central portion and having end portions journalled in the openings in the housing and cover plate, said ratchet member having an opening extending therethrough on the axis of said end portions and of non-circular form for non-rotatable engagement with a shaft, a double ratchet pawl having oppositely acting pawl arms, each pawl arm having at least one tooth thereon for interengagement with teeth on the ratchet member, means positioned laterally of the ratchet member pivotally mounting the ratchet pawl in the housing on an axis parallel to the axis of the said end portions of the ratchet member, means outside the housing for selectively positioning the ratchet pawl to engage selectively the pawl arms thereof with the teeth of the ratchet member, a projecting cam member on the ratchet pawl, spring means engageable with opposite sides of the cam for holding the pawl arms in engagement with the teeth of the ratchet member as selected, the interengagement between each pawl arm and the teeth of the ratchet member being such that when the crank is turned in one direction the pawl transmits torque to the ratchet member and holds the ratchet member immovable in the housing to thereby transmit torque to the shaft, and when the crank is turned in the opposite direction the tooth of the selected pawl arm rides over the teeth on the ratchet arm.

References Cited in the file of this patent

UNITED STATES PATENTS

| | | |
|---|---|---|
| 1,941,214 | Kusterle | Dec. 26, 1933 |
| 2,188,846 | Rueb | Jan. 30, 1940 |
| 2,232,477 | Rueb | Feb. 18, 1941 |
| 2,505,678 | Kull | Apr. 25, 1950 |
| 2,677,975 | Russell | May 11, 1954 |